(12) United States Patent
Schapira et al.

(10) Patent No.: US 6,787,065 B1
(45) Date of Patent: Sep. 7, 2004

(54) USE OF A COMPOSITION OR PREMIX BASED ON VOLATILE CORROSION INHIBITORS, COMPOSITION OR PREMIX, ARTICLES COMPRISING SAID COMPOSITION AND PREPARATION METHOD

(75) Inventors: Joseph Schapira, Paris (FR); Patrick Droniou, Colombes (FR); Loic Guillou, Chatou (FR); Gabriela Stoianovici, Saint Gratien (FR); Patrick Delalande, Dammart (FR)

(73) Assignee: Henkel KGaA, Dusseldorf (DE)

( * ) Notice: Subject to any disclaimer, the term of this patent is extended or adjusted under 35 U.S.C. 154(b) by 0 days.

(21) Appl. No.: 09/622,448

(22) PCT Filed: Dec. 30, 1998

(86) PCT No.: PCT/FR98/02920

§ 371 (c)(1),
(2), (4) Date: Nov. 16, 2000

(87) PCT Pub. No.: WO99/42640

PCT Pub. Date: Aug. 26, 1999

(30) Foreign Application Priority Data

Feb. 17, 1998 (FR) .............................................. 98 01902

(51) Int. Cl.[7] .......................... C23F 11/02; C08K 5/35; C08K 5/34; C08K 5/17; C08K 3/28
(52) U.S. Cl. ............................ 252/389.61; 252/389.62; 524/96; 524/106; 524/251; 524/252; 524/257; 524/429
(58) Field of Search ...................... 252/389.61, 389.62; 524/96, 106, 251, 252, 257, 429

(56) References Cited

U.S. PATENT DOCUMENTS

| | | | | |
|---|---|---|---|---|
| 2,643,176 A | * | 6/1953 | Wachter et al. ............. | 162/160 |
| 2,758,981 A | * | 8/1956 | Cooke et al. ................ | 524/317 |
| 2,829,080 A | * | 4/1958 | Fessler et al. .............. | 428/220 |
| 2,918,389 A | | 12/1959 | Kelley | |
| 3,035,005 A | * | 5/1962 | Sampson .................... | 524/297 |
| 3,425,954 A | | 2/1969 | Ruzevick et al. | |
| 4,290,912 A | * | 9/1981 | Boerwinkle et al. ..... | 252/389.3 |
| 4,913,874 A | | 4/1990 | Pinchuk et al. | |
| 6,033,599 A | * | 3/2000 | Lozano et al. ......... | 252/389.54 |

FOREIGN PATENT DOCUMENTS

| | | | | |
|---|---|---|---|---|
| BR | 9001035 A | * 10/1991 | ........... | C08F/10/02 |
| GB | 2 188 274 | 12/1986 | | |
| JP | 04337334 A | * 11/1992 | .............. | C08J/3/22 |
| JP | 10-237444 | * 9/1998 | ........... | C08K/15/02 |

OTHER PUBLICATIONS

JPO machine translation of JP 10–237444 (Sep. 8, 1998).*
USPTO translation of BR 90–01035 (Oct. 15, 1991).*
USPTO translation of DE 35 45 473 A (Jul. 2, 1987).*
USPTO obtained translation of JP 04337334 A.*
Abstract in English of DE 341 71 49 (Dec. 19, 1985).
Abstract in English of BR 900 10 35 (Brazil), Oct. 15, 1991.

* cited by examiner

*Primary Examiner*—Matthew A. Thexton
(74) *Attorney, Agent, or Firm*—Kilpatrick Stockton LLP

(57) ABSTRACT

The invention concerns the use of a composition or premix based on volatile corrosion inhibitors comprising, in order to limit to a maximum the release and/or degradation of the volatile corrosion inhibitors when the composition or premix is being formed, either an efficient amount of a structuring agent consisting of at least one solid or pasty substance whereof the melting point ranges from 40 to 110° C. preferably from 50 to 90° C., or a liquid substance capable of forming, mixed with a mineral filler, a solid or pasty combination. The invention also concerns a composition based on volatile corrosion inhibitors comprising a composition based on volatile corrosion inhibitors comprising an efficient amount which contains an efficient amount of a solid structuring agent. The invention further concerns polymer based articles having as constituent said composition or premix; said article are useful for protecting metal parts against corrosion.

16 Claims, No Drawings

USE OF A COMPOSITION OR PREMIX BASED ON VOLATILE CORROSION INHIBITORS, COMPOSITION OR PREMIX, ARTICLES COMPRISING SAID COMPOSITION AND PREPARATION METHOD

The invention concerns the use of a composition or premix based on volatile corrosion inhibitors for limiting to a maximum the degradation or release of volatile corrosion inhibitors during the preparation of the said composition.

It also concerns a composition or premix based on volatile corrosion inhibitors.

It furthermore concerns articles based on polymers and of which one of the components consists of this composition or premix, as well as the method for preparing these articles which comprise in particular packaging films, packages constructed from sheets and other parts based on polymers.

It also concerns articles in the form of pasty solids based on structuring agents and of which one of the components consists of the said composition or premix.

It finally concerns the use of the abovementioned composition and articles for the protection of metal parts against corrosion.

The use of volatile corrosion inhibitors is known when metal parts which are sensitive to corrosion are to be protected, in particular those which are made of mild steel with a low carbon content and which, once machined, are despatched as they are to their destination by maritime container with a view to their being finished on site, in particular by painting. The risks of corrosion are then considerable, especially when the parts in question are dispatched to hot and humid areas.

Volatile corrosion inhibitors offer very good protection against corrosion under these conditions and have the advantage of making it possible to avoid having to use conventional techniques for protecting metal parts; these conventional techniques consist of applying paints, varnishes, plastics, waxes, greases and oils which have to be removed before finishing on site, which leads to additional costs and pollution.

Volatile corrosion inhibitors, generally denoted by VCI, employ additives of which the vapour pressure may be considered appreciable at the temperature of use (for example of the order of $10^{-5}$ to $10^{-1}$ mm Hg at 20° C.) and which are capable of inhibiting the corrosion of metals.

These VCIs act by virtue of the fact that they are conveyed in vapour form to the metal surface to be protected, to be absorbed thereon or even dissolved in any condensation water.

Products are also known which are classified in a wider sense as VCIs by the fact that one of their reaction products has an adequate vapour pressure. Accordingly, for example, sodium nitrite, in the presence of ammonium ions, can form ammonium nitrite which is relatively volatile. The original sodium nitrite is then considered as a VCI.

The use of a mixture of different products classified in a wider sense as VCIs in an inert liquid vehicle is recommended in order to obtain an optimum anticorrosive effect whatever the composition of the material to be protected (BE 702592).

When the metal parts to be protected are packaged inside films, the VCIs are incorporated in the material constituting these films, and given that these films may be situated in direct contact with the surface of the products to be protected, corrosion inhibitors acting by contact are also incorporated in the mass constituting these films.

The advantages of this protective technique by means of packaging in a film containing VCIs, lie in its great ease of application and the overall protection provided, given that the vapours penetrate into the most inaccessible places of parts with complex forms without it being necessary to resort to cleaning or previous preparation, any de-protection operation and any pollution being moreover eliminated.

It is sometimes necessary to protect against corrosion only portions of large metal parts having a complex geometry. Pasty solids formed by the normal techniques of the polymer industry (moulding, modelling, extrusion) provide metal parts with the necessary localized protection, considerably minimizing costs.

In order to incorporate VCIs in the mass constituting films or other packaging articles which are often based on thermoplastic polymers, it is known to produce direct mixtures of VCI powders with polymers and to form packaging films or solid parts such as sheets directly by extrusion or blowing.

At the extrusion temperature, which is approximately 160° C. for low density polyethylene and 240° C. for polypropylene, VCIs have an extremely high volatility which leads, in the case of the manufacture of a film, to the appearance of a high porosity and a high risk of degradation and/or decomposition with elimination of at least part of the VCIs. The efficiency of such films from the anticorrosion point of view is thus greatly reduced following the loss of active materials.

In order to overcome this disadvantage, i.e. in order to limit the loss of VCI during the actual preparation of the finished articles, it has been proposed to use premixes containing VCIs, i.e. concentrates of active material dispersed in supports such as polymers, solvents and plasticizers. Premixes based on polymers (Patent BR-A-9001035) have the general advantage of being homogeneous and easy to handle; these premixes are then incorporated in the polymers with a view to preparing packaging articles.

Given however, that the temperatures employed when premixes are prepared are often above 150° C., at least partial degradation of the said premixes is observed and thus, as an example, it is noted that dicyclohexylamine nitrite, mixed and extruded with polyethylene at 160° C., results in granules of premix which have a dark yellow coloration, characteristic of a high degree of degradation i.e. a loss of activity.

In order to prevent this excessive degradation by heat, it has been proposed to use liquid premixes, based on oil, which do not need high temperatures during their manufacture (U.S. Pat. No. 4,913,874).

However, given that VCIs are not frequently soluble in these oily media, a heterogeneity of the premix results, as well as the appearance of difficulties due to local excess or reduced concentrations when they are subsequently incorporated in polymers from which the final articles are made.

It has also been proposed to overcome this disadvantage by using liquid premixes in the form of solvent-containing or oily solutions containing VCIs, premixes which are not incorporated during extrusion but are applied onto these films by spraying, forming in this way, after the evaporation of the solvent, either a powdered VCI layer (patent DE 3 417 149 A1), or an oily layer containing the VCIs (patent GB 2 188 274 A).

The disadvantage of these premixes lies in the fact that the VCIs are not imprisoned in a matrix to give a slow release, so that the protection obtained is of short duration. In addition, the adhesion of the layers deposited on the articles is low and leads to losses during handling and the need to clean the parts which have to be protected, which is precisely what one wishes to avoid.

The object of the invention is especially to overcome the disadvantages of the previous techniques and to provide compositions based on VCI, responding better to the various practical requirements than those which already exist. Its objective is also to provide finished articles employing at least one composition based on VCI according to the invention.

The object of the invention is finally to provide novel uses for these compositions based on VCI, such as the partial and localized protection of certain large metal parts having complex forms.

In addition, it is to the credit of the Applicant Company that it has found, following in-depth research, that these objectives were achieved as soon as structuring agents were incorporated in a composition based on volatile corrosion inhibitors, said structuring agents being capable of enabling a premix to be prepared at sufficiently low temperatures so as to limit to a maximum the release and/or degradation of VCIs during this preparation.

Consequently, the object of the invention is the use of a composition or premix based on volatile corrosion inhibitors which includes, in order to limit to a maximum the release and/or degradation of VCIs when the composition or premix is formed, either an effective quantity of a structuring agent, consisting of at least one solid or pasty substance of which the melting point is 40 to 110° C., preferably from 50 to 90° C., or a liquid substance capable of forming, when mixed with a mineral filler, a pasty or solid whole.

According to one advantageous embodiment, in the use according to the invention, the composition comprises 1 to 90%, preferably 20 to 60% by weight of at least one volatile corrosion inhibitor and 10 to 99%, preferably 40 to 80%, of at least one of the structuring agents defined above.

According to another advantageous embodiment, in the use according to the invention, the composition includes at least one structuring agent chosen from the group of those comprising solid or pasty aliphatic and/or resinous compounds with a low melting point of between 40 and 110° C., preferably between 50 and 90° C.

According to another advantageous embodiment of the use according to the invention, the structuring agent of the composition is chosen from the group comprising linear and/or only slightly branched mono- or polyfunctional aliphatic organic compounds with hydrocarbon chains having at least 10 carbon atoms, including in particular:

saturated or unsaturated, possibly oxidized, mono- or dicarboxylic acids, their esters and their salts, phosphoric, sulfonic and phosphoric acids, their esters with alcohols and their salts of alkali metals, alkaline earths, zinc, aluminium and/or organic amines, cyclic or acyclic compounds of the group comprising lactones, ketones, aldehydes, amides and acetals, cyclic or acyclic, possibly polyalkoxylated, primary or secondary higher alcohols with a hydrocarbon chain having at least 10 carbon atoms, linear and/or only slightly branched aliphatic hydrocarbons, in particular paraffins and isoparaffins, polyolefins and their copolymers with low molecular masses of 3000 to 20000 g/mole, polyglycols, in particular polyethyleneglycols with a molecular mass of 2000 to 10000 g/mole.

According to another advantageous embodiment of the use according to the invention, the structuring agent of the composition is chosen from the group comprising resinous compounds having a polymeric and/or cyclic structure and which may contain aromatic derivatives and cyclic terpenes in a minor proportion.

According to another advantageous embodiment of the use according to the invention, the structuring agent of the composition is chosen from the group of those identified in Table A below and of which some are waxes of natural or synthetic origin.

TABLE A

| Origin of structuring agent | Principal chemical nature of structuring agent | Name of structuring agent | Melting point (° C.) | Density at 25° C. ASTM D 1298 | Penetration index at 25° C. ASTM D1321 |
|---|---|---|---|---|---|
| Natural | Ester (myricyl cirotate) | Carnauba wax | 83–86 | 0.995 | — |
|  | Ester (myricyl palmitate) | Bees wax | 62–65 | 0.955 | — |
| Mineral | Paraffinic hydrocarbons (mixture) | Paraffin wax | 50–60 | 0.900 | 15 |
|  | Isoparaffinic and naphthenic hydrocarbons | Microcrystalline wax | 69 | 0.930 | 29 |
|  | Aliphatic hydrocarbons (mixture) | Petrolatum | 70–72 | 0.910/ 20° C. | 43–45 |
| Synthetic | Polyethylene | Polyethylene wax | 88 | 0.930 | 6.5 |
|  | Oxidized isoparaffinic hydrocarbons | Oxidized microcrystalline wax | 85 | — | 13 |
|  | Phosphoric ester of fatty alcohols $C_{16}/C_{18}$ | — | 83–89 | 0.998 | — |
|  | Polyethyleneglycol | Polyethyleneglycol 4000 | 57–59 | 1.112/ 99° C. | — |

The invention also concerns a composition or premix based on volatile corrosion inhibitors, characterized in that it includes an effective quantity of at least one structuring agent consisting of a solid substance of which the melting point is 40 to 110° C., preferably 50 to 90° C., by means of which the release and/or degradation of volatile corrosion inhibitors is limited to a maximum when the composition or premix is formed.

According to one advantageous embodiment, the composition according to the invention comprises 1 to 90%, preferably 20 to 60% by weight of at least one volatile corrosion inhibitor and 10 to 99%, preferably 40 to 80% of at least one structuring agent consisting of a solid substance of which the melting point is 40 to 110° C., preferably 50 to 90° C.

According to another advantageous embodiment, the composition according to the invention includes at least one structuring agent chosen from the group of those comprising solid aliphatic and/or resinous compounds with a low melting point of between 40 and 110° C., preferably between 50 and 90° C.

According to another advantageous embodiment of the composition according to the invention, the solid structuring agent is chosen from the group comprising linear and/or only slightly branched mono- or polyfunctional aliphatic organic compounds with hydrocarbon chains having at least 10 carbon atoms, including in particular:

saturated or unsaturated, possibly oxidized, mono- or dicarboxylic acids, their esters and their salts, phosphoric, sulfonic and phosphonic acids, their esters with alcohols and their salts of alkali metals, alkaline earths, zinc, aluminium and/or organic amines, cyclic or acyclic compounds of the group comprising lactones, ketones, aldehydes, amides and acetals, cyclic or acyclic, possibly polyalkoxylated, primary or secondary higher alcohols with a hydrocarbon chain having at least 10 carbon atoms, linear and/or only slightly branched aliphatic hydrocarbons, in particular paraffins and isoparaffins, polyolefins and their copolymers with low molecular masses of 3000 to 20000 g/mole, polyglycols, in particular polyethyleneglycols with a molecular mass of 2000 to 10000 g/mole.

According to another advantageous embodiment of the composition according to the invention, the solid structuring agent is chosen from the group comprising resinous compounds having a polymeric and/or cyclic structure and which may contain, in a minor proportion, aromatic derivatives and cyclic terpenes.

According to another advantageous embodiment, the composition according to the invention and the composition used according to the invention include at least one volatile corrosion inhibitor chosen from the group comprising:

nitrogen-containing derivatives and in particular, on the one hand, aliphatic, aromatic, acyclic or cyclic amines, including dicyclohexylamine, cyclohexylamine, morpholine, diisopropylamine and benzylamine, their organic salts, including benzoates, carbamates, laurates, caprylates, succinates or their inorganic salts including nitrites, nitrates, carbonates, phosphates, phosphites and, on the other hand, heterocyclic compounds including imidazole and its derivatives, triazoles and their derivatives, as well as hexamethylenetetramine, oxido nitrogen-containing derivatives including the alkali metal or alkaline earth salts of nitrous acid and the benzoic derivatives of these metals such as sodium benzoate.

It is possible to include in the composition used according to the invention or in the composition and/or finished articles according to the invention, one or more additives chosen from the group comprising:

antioxidant agents and/or degradation inhibitors including bisphenol A, butylhydroxytoluene, di-tert-butylphosphite, trinonylphenoxyphosphite, dilaurylthiodipropionate, anti-UV absorbing agents including benzotriazoles, triazines, hydroxybenzophenones, and radical inhibitors including SHAs or Steric Hindrance Amines and HALS or Hindered Amine Light Stabilizers, external antistatic agents including the phosphoric ethers of ethoxylated alcohols and ethoxylated amine chlorides, or internal antistatic agents including ethoxylated fatty amines, ethoxylated polyols and alkylsulfonates, external or internal lubricating agents including paraffins, fatty alcohols, fatty acids, esters of fatty acids and alcohols and amides, plasticizing agents including dioctylphthalate, tricresylphosphate, the diesters of aliphatic acids, inorganic pigments including $PbSO_4$, $PbCrO_4$, CdS. ZnS, and organic pigments including azo, phthalocyanin or anthraquinone derivatives and fire retardants including the brominated and chlorinated compounds of phosphorus, the hydrides of compounds of Al, Mg and Zn, as well as epoxy oligomers, mineral fillers including chalks and carbonates, talcs, clays and silicas.

These additives may also be added only at the moment when the composition is incorporated in the polymer from which the articles according to the invention are manufactured, or in the structuring agent.

These articles are characterized in that at least one of their components consists of a composition according to the invention or in that they use a composition according to the invention, and in that they are prepared, according to a first possibility, from at least one polymer which enters into their constitution to the extent of at least 50% by weight The abovementioned polymers which enter into the constitution of packagings and/or articles to the extent of at least 50% by mass, may be chosen from those of the group comprising:

polyolefins, including polyethylenes, polypropylene, polybutene and their copolymers with one or more unsaturated monomers including vinyl acetate, acrylic acid and its esters with alcohols having a short carbon chain, polyvinyl chloride and its copolymers, acrylic copolymers and their derivatives, and polyamides, polystyrenes, polycarbonates, polyesters, polyurethanes, rubbers including natural rubber, styrene-butadiene and polychloroprene.

These finished articles, into the constitution of which the composition according to the invention enters, or which use a composition according to the invention, comprise not only flexible or rigid films, which are possibly retractable, but also other elements including in particular wires, tubes which are possibly formed and sheets which are possibly cellular, from which it is possible to produce packaging including a more or less sealed cavity filled with a confined atmosphere containing VCIs coming from the composition or premix, and it is within this cavity that the metal parts to be protected against corrosion are placed.

These packages may consist of single films but also of assemblies of several of the abovementioned elements, these assemblies being produced by employing any suitable method, including stapling, crimping, thermoforming, skin-packing or the manufacture of blisters.

The previously mentioned sheets may be obtained from two films according to the invention, while leaving a space between these films, it being possible for this space to be in the form of cells, or a corrugated network obtained from a third film, the assembly having the appearance of a corrugated cardboard.

The packages made from the said sheets may have channels for communication between the inside of the cavity delimited by the package and the outside, these channels having a diameter generally less than a millimetre, allowing in this way only a limited flow of air.

The communicating channels in question are established at the time when the packagings including the composition according to the invention are manufactured, or subsequently.

According to a second possibility and more precisely in the case where protection of only a portion of the metal part against corrosion is to be ensured, the article concerned by the invention is essentially based on the composition according to the invention or on the composition used according to the invention, including modelling or moulding pastes and mastics, the article thus constituted having, by virtue of its plastic character, the advantage of easy handling, and the possibility of producing at the last moment the form best suited to the geometry of the portion to be protected.

It will be recalled that mastics comprise polymers and that the modelling pastes that are free from polymers contain insoluble fillers such as the abovementioned mineral fillers.

The method for preparing these articles generally comprises successively a step for preparing a composition or premix according to the invention and a subsequent step during which the premix is incorporated in one of the abovementioned polymers, the actual packagings and articles being obtained, in particular by extrusion or blowing or by injection from the mixture comprising the premix and the polymer.

Alternatively, and in the case of pasty premixes not including polymers requiring heating during manufacture, this method may be carried out in a single step, these articles being obtained by mixing operations specific to the use of single- or two-component mastics and pasty solids.

The articles in question are used for protecting metal parts sensitive to corrosion during their transport or storage, without a complementary protective treatment being applied to these parts.

The invention will be even better understood with the aid of the following non-limiting examples which concern advantageous embodiments.

EXAMPLE 1

With a view to preparing a VCI, 70 g of sodium nitrite, 17.5 g of benzotriazole and 12.5 g of ammonium benzoate were mixed and then micronized in an airjet micronizer to give 100 g of a homogeneous powdered mixture, denoted by 1a, having a mean particle size of between 1 and 15 µm. This powder constitutes a VCI.

226 g of paraffin wax defined in Table A were melted at 65° C. in a heating vessel provided with a rotating and scraping stirrer then 100 g of the powder 1a were incorporated in the molten mass and carefully dispersed.

2 g of anti-UV agent (marketed under the trade name TINUVIN 622 LD by Ciba Geigy) were then added together with 2 g of antioxidant-degradation inhibitor (marketed under the trade name CHIMASSORB 944 LD by Ciba Geigy) and 3 g of yellow colorant Colour Index PY 10401/70.

Dispersion was carried out by stirring at a rate of between 300 to 500 revolutions/minute. for 10 minutes.

333 g of the mixture thus obtained, which constituted a premix 1b, were poured, in order to be cooled, onto a laboratory casting table ("écailleuse") kept at 10° C. and then cut up into flakes of between 0.5 and 10 mm in size.

300 g of the premix 1b were mixed cold in a homogeneous manner with 5.7 kg of low density polyethylene (d=0.920 g/cm$^3$ and fluidity index FI=2 g/10 minutes), the mixture being extruded at 140° C. in one minute in a single screw extruder-film former, which provided a transparent yellow tubular film, 90±10 µm thick, denoted by 1c. This film was effective against the corrosion of ferrous metals.

The efficiency of this film from the point of view of protection against corrosion was tested on specimens in the form of mild steel blocks. The test used corresponded to the North American standard FED-STD 101, method 4031B.

This method consisted of placing a steel block in a confined atmosphere loaded with VCI released from the film, and then of causing condensation to form on the surface of the block by controlled cooling so as to produce possible oxidation after a set time. The degree of rusting indicated the anticorrosion efficiency of the protective film towards the material constituting the block.

On completion of this test it was found that the steel block protected by the film 1c exhibited slight staining over approximately 30% of its surface; there was thus no corrosion there.

The same test was performed as a comparison using a "control" film denoted by 1d. The control film 1d was identical in all respects to the film 1c apart from the fact that it did not contain the VCI identified above. 100 g of the mixture 1a were replaced, during preparation of the premix, by 100 g of mineral filler based on calcium carbonate. On completion of the test, the block protected with the control film 1d was completely attacked, with many pits and rust being observed over 100% of its surface in contact with the confined atmosphere.

EXAMPLE 2

With a view to preparing a VCI, 50 g of ammonium benzoate, 25 g of aminotriazole and 25 g of hexamethylenetetramine were mixed and then micronized in an airjet micronizer to give 100 g of a homogeneous powdered mixture, denoted by 2a, having a mean particle size of between 1 and 15 µm.

235 g of Carnauba wax identified in Table A were melted at 90° C. in a heating vessel provided with a rotating and scraping stirrer and 100 g of the powder 2a were incorporated in the molten mass and carefully dispersed.

Dispersion was carried out by stirring at a rate of between 300 to 600 revolutions/minute for 5 minutes.

335 g of the premix 2b thus obtained were poured, in order to be cooled, onto a laboratory casting table kept at 15° C. and then cut into flakes of between 0.5 and 10 mm in size.

300 g of the premix 2b were mixed cold in a homogeneous manner with 5.1 kg of low density polyethylene (d=0.920 g/cm$^3$ and fluidity index FI=2 g/10 minutes) and 0.6 kg of an ethylene/vinyl acetate copolymer (marketed under the trade name ESCORENE ULTRA by Exxon), 0.1 g of anti-UV agent (marketed under the trade name TINUVIN 622 LD by Ciba Geigy), 0.1 g of antioxidant-degradation inhibitor (marketed under the trade name CHIMASSORB 944 LD by Ciba Geigy) and 3 g of a branded yellow colorant Colour Index PY 10401.

The mixture was extruded at 120° C. in one minute in a single screw extruder-film former, which provided a transparent yellow tubular film, 90±10 μm thick, denoted by 2c.

The efficiency of this film against the corrosion of ferrous metals was demonstrated by means of the test described in example 1.

On completion of this test, the steel block protected by the film according to the invention exhibited only slight but acceptable staining over approximately 10% of its surface, whereas the steel block protected by the control film exhibited many pits and rust over 100% of its surface.

EXAMPLE 3

With a view to preparing a VCI, 75 g of benzotriazole, 15 g of tolyltriazole and 10 g of ammonium benzoate were mixed and then micronized in an airjet micronizer to give 100 g of a homogeneous powdered mixture, having a mean particle size of between 1 and 15 μm, denoted by 3a.

230 g of microcrystalline wax identified in Table A were melted at 75° C. in a heating vessel provided with a rotating and scraping stirrer, 100 g of the powder 3a were then incorporated in the molten mass and carefully dispersed.

3 g of green colorant Colour Index PG 7 (azo pigment) were added.

Dispersion was carried out by stirring at a rate of between 300 to 500 revolutions/minute for 10 minutes.

333 g of the premix 3b thus obtained were poured, in order to be cooled, onto a laboratory casting table kept at 10° C. and then cut into flakes of between 0.5 and 10 mm in size.

300 g of the premix 3b were mixed cold in a homogeneous manner with 5.7 kg of low density polyethylene (d=0.920 g/cm$^3$ and fluidity index FI=2 g/10 minutes), the whole being extruded at 140° C. in one minute in a single screw extruder-film former, which provided a transparent green tubular film, 90±10 μm thick, denoted by 3c.

This film was effective against the corrosion of copper-based alloys.

Its efficiency was tested by the thioacetamide test on specimens made of copper of electrolytic purity, according to Swiss standard SN 289 650.

In order to do this, a copper block was placed in a cavity-filled with a confined atmosphere having a relative humidity of approximately 75%. This confined atmosphere was loaded with VCI released from a piece of the film 3c also placed in this cavity, in the presence of thioacetamide liberating sulfur-containing derivatives. On completion of the test a visual examination was made of the corrosion on the surface of the block. The degree of degradation indicated the anticorrosion efficiency of the protective film towards the copper constituting the block.

After 48 hours of test, the copper block protected by a 160 cm$^2$ cutting from the film 3c exhibited a slight change of colour over approximately 10% of the surface, this consisting of a golden tint on the periphery of the block which showed that there was no corrosion.

The same test was carried out as a comparison, using a "control" film 3d. This consisted of a film identical to 3c, apart from the fact that it did not contain a VCI, 100 g of the mixture 3a being replaced, during preparation of the premix, by 100 g of mineral filler based on calcium carbonate.

On completion of the test, the block protected by the control film 3d exhibited a very considerable change in colour over 100% of its surface in contact with the confined atmosphere, this consisting of an intense golden to reddish tint which indicated considerable corrosion.

EXAMPLE 4

With a view to preparing a VCI, 50 g of ammonium benzoate, 25 g of benzotriazole and 25 g of dicyclohexylamine o-nitrobenzoate were mixed and then micronized in an airjet micronizer to give 100 g of a homogeneous powdered mixture, denoted by 4a, having a mean particle size of between 1 and 15 μm.

226 g of beeswax identified in Table A were melted at 70° C. in a heating vessel provided with a rotating and scraping stirrer and 100 g of the powder 4a were then incorporated in the molten mass and carefully dispersed.

2 g of anti-UV agent (marketed under the trade name TINUVIN 622 LD by Ciba Geigy) were then added together with 2 g of silver antioxidant-degradation inhibitor (marketed under the trade name CHIMASSORB 944 LD by Ciba Geigy).

Dispersion was carried out by stirring at a rate of between 300 to 500 revolutions/minute for 10 minutes.

330 g of the premix 4b thus obtained were poured, in order to be cooled, onto a laboratory casting table kept at 10° C. and then cut into flakes of between 0.5 and 10 mm in size.

300 g of the premix 4b in the form of flakes were mixed cold in a homogeneous manner with 5.7 kg of low density polyethylene (d=0.925 g/cm$^3$ and fluidity index FI=20 g/10 minutes), the mixture thus obtained being injected at 160° C. into the mould, cooled to 40° C., of a machine of the type of the Battenfeld Plus 250 marketed by the Battenfeld Company. Small sheets denoted by 4c were obtained in this way; they were colourless, translucent and 50×60×2 mm in size, used for the anticorrosion protection of silver.

These small sheets were packaged in a film of neutral polyethylene together with a piece of silver, for example a piece of jewellery to be protected. By virtue of the VCI which was released from the small sheets 4c, blackening of the silver, characteristic of the ageing of this material, was prevented.

EXAMPLE 5

With a view to preparing a VCI, 45 g of benzotriazole, 45 g of ammonium benzoate and 10 g of potassium sorbate were mixed and then micronized in an airjet micronizer to give 100 g of a homogeneous powdered mixture, denoted by 5a, having a mean particle size of between 1 and 15 μm.

226 g of the phosphoric ester of $C_{16}/C_{18}$ fatty alcohols identified in Table A were melted at 90° C. in a heating vessel provided with a rotating and scraping stirrer and 100 g of the powder 5a were then incorporated in the molten mass and carefully dispersed.

2 g of anti-UV agent (marketed under the trade name TINUVIN 622 LD by Ciba Geigy) were then added together with 2 g of antioxidant-degradation inhibitor (marketed under the trade name CHIMASSORB 944 LD by Ciba Geigy) and 3 g of blue pigment Colour Index PB 15 (phthalocyanin pigment).

Dispersion was carried out by stirring at a rate of between 300 to 600 revolutions/minute for 5 minutes.

333 g of the premix 5b thus obtained were poured, in order to be cooled, onto a laboratory casting table kept at 15° C. and then cut into flakes of between 0.5 and 10 mm in size.

300 g of the premix 5b were mixed cold in a homogeneous manner with 5.7 kg of low density polyethylene (d=0.920 g/cm$^3$ and fluidity index FI=2 g/10 minutes), the mixture thus obtained being extruded at 140° C. in one minute in a single screw extruder-film former, which provided a transparent blue tubular packaging film, 90±10 μm thick, denoted by 5c.

By virtue of its VCI content, this film 5c was effective against the corrosion of pieces of aluminium packaged in this film.

The anticorrosion properties of the film 5c were tested on blocks of aluminium alloy, grade 5052 in ISO nomenclature, using a test corresponding to Swiss standard 289 650 which comprised a test with chlorinated agents.

This test consisted of placing an aluminium alloy block acting as a test piece in a confined humid atmosphere loaded with a known quantity of Javel water capable of liberating corrosive gaseous chlorine, in the presence of the packaging film 5c from which vapours of the VCI contained therein were released. The degree of degradation of the piece after having been kept in this atmosphere for 24 hours at a temperature of 40° C. characterized the efficiency of the film 5c against corrosion by chlorine of the material constituting the block.

On completion of the test, namely after 24 hours, the surface of the aluminium block protected by a 160 cm$^2$ cutting of the film 5c did not exhibit any colour change or any tarnishing.

The same test was performed as a comparison using a "control" film 5d. This consisted of a film identical in all respects to the film 5c, apart from the fact that it did not contain a VCI. 100 g of the mixture 5a were in point of fact replaced, during manufacture of the premix substituting the premix 5b, by 100 g of a totally different mineral filler based on calcium carbonate which was ineffective in the desired application.

At the end of the same test time, the block protected by the control film 5d exhibited white pits and tarnishing over the entire surface in contact with the confined atmosphere.

EXAMPLE 6

With a view to preparing a VCI, 300 g of the premix 1b according to example 1 were mixed cold in a homogeneous manner with 5.7 kg of low density polyethylene (d=0.920 g/cm$^3$ and fluidity index FI=2 g/10 minutes), and the whole was extruded at 140° C. in one minute in a single screw extruder-film former, which provided a transparent yellow-coloured tubular film, 150±10 μm thick.

This film was drawn with a draw factor of 2.5 in the two orthogonal directions of the plane, before being cooled with a view to its subsequent use as a packaging film for the protection of ferrous metals against corrosion. It was denoted by 6c.

300 g of the premix 1b were mixed cold in a homogeneous manner with 5.7 kg of an ethylene/propylene copolymer having 5% ethylene, (d=0.895 g/cm$^3$ and fluidity index FI=4 g/10 minutes–value at 230° C.) and the whole was extruded through three flat dies arranged, as described in French patent FR 2 142 752, in one minute in a single screw extruder at 180° C., which made it possible to obtain a yellow cellular sheet having the constitution of corrugated cardboard, having a total thickness of 3.5 mm and a mass per unit area of 800 g/m$^2$. This sheet was effective against the corrosion of ferrous metals.

It was subjected to a conventional surface treatment of the corona type (treatment by gas plasma) on both faces so as to facilitate subsequent gluing. It was then coated with an adhesive which was solid at ambient temperature, based on an ethylene/acrylic ester copolymer (acrylic ester content of 15%, fluidity index FI=4 g/10 minutes).

This sheet was denoted by 6d.

A package or packaging for metal parts sensitive to corrosion was produced by the thermoforming technique and in the manner indicated above from the film 6c and the sheet 6d.

The sheet 6d was provided with an assembly of holes by means of a multi-hole piercing device.

The holes thus obtained, having a conical form, had a diameter of less than 1 mm and were spaced apart by approximately 1 cm.

A metal part was positioned on the sheet 6d, placed in a skin-packing machine with the trade name MECASKIN 53M, marketed by the SDMF Company.

The film 6c, immobilized in a panel-clamping frame situated above the sheet 6d, was heated for 12 seconds at 90–95° C. with the aid of radiant panels. Once slackened and then re-tensioned it was pressed against and moulded onto the part to be protected, placed on the sheet 6d, with the aid of a partial vacuum of 680 to 720 mm Hg, applied for approximately 5 seconds.

The vacuum penetrated between the two materials 6c and 6d through the holes made in the sheet 6d. During this operation, the film 6c and the sheet 6d were glued onto one contact surface.

The cavity thus formed in which the metal parts were housed, contained VCI vapours released from the film and the sheet, even though this cavity communicated with the outside atmosphere via the holes included in the sheet. The escape of inhibitors from inside the cavity was limited to a considerable extent by virtue of the airlock effect provided by the cellular structure of the sheet. The packaging assembly was effective for a prolonged period of storage of the metal part for two years.

EXAMPLE 7

With a view to preparing a VCI, 150 g of paraffin wax and 150 g of petrolatum wax, defined in Table A, were melted and mixed at 70° C. in a heating vessel, provided with a rotating and scraping stirrer.

150 g of naphthenic oil (marketed under the trade name NYTEX 810 by Nynas, having a density of 0.901 at 15° C. and a refractive index of 1.493) were then added and incorporated in the mixture of molten waxes in order to obtain a clear homogeneous viscous liquid having a dark brown colour.

The following were incorporated and carefully dispersed in this molten mass, with stirring varying progressively from 500 to 1500 revolutions/minute for 45 minutes: 300 g of chalk (marketed under the trade name OMYA BL by Omya SA, having a density of 2.7 and a mean particle size of 10 μm), 100 g of kaolin (marketed under the trade name SPESWHITE by EEC International, having a density of 2.6, a mean particle size of 2 μm and an oil absorption value of 48 ml/100 g) and 100 g of micronized talc (marketed under the trade name "TALC 10M2" by Luzenac Talcs, having a density of 2.78, a mean particle size of 10 μm and an oil absorption value of 48 ml/100 g). The temperature was held at 65° C.

950 g of a smooth fluid beige-coloured paste were obtained; which constituted the mixture [7a].

50 g of the premix [1b], described in example 1, were incorporated and then dispersed in this paste, kept at 65° C., by moderate stirring at between 300 and 1000 revolutions/minute, for 10 minutes.

The 1000 g of pasty mixture thus obtained were then left to cool for 15 minutes with gentle stirring at approximately 300 revolutions/minute at ambient temperature.

This beige-yellow coloured pasty mixture, which constituted a VCI which could be modelled, was denoted by [7c]. It was effective against the corrosion of ferrous metals.

The volatile anticorrosion efficiency of this VCI modelling paste [7c] was tested on mild steel specimens in the form of blocks. The tests used corresponded to the North American standard FED-STD 101, method 4031B, described in example 1.

On completion of this test, it was found that the steel block protected by the corrosion inhibiting vapours which were released from 2 g of the VCI paste [7c] did not exhibit any oxidation on its surface.

The same test was performed as a comparison using a "control" modelling paste, denoted by [7d] which was identical in every respect to the paste [7c], apart from the fact that it did not contain the VCI identified above [1b]. The 50 g of premix [1b] were replaced in the composition [7d] by 50 g of chalk.

On completion of the test, the block protected by the control modelling paste [7d] was completely attacked and many pits and rust were observed over 100% of its surface.

EXAMPLE 8

With a view to preparing a VCI, 300 g of petrolatum wax, identified in table A, were melted at 70° C. in a heating vessel provided with a rotating and scraping stirrer.

350 g of chalk identified in example 7 and 300 g of kaolin identified in example 7 were incorporated and dispersed progressively with stirring varying from 500 to 2000 revolutions/minute for 45 minutes.

950 g of a smooth fluid beige-coloured paste were obtained which constituted the mixture [8a], 50 g of the premix [2b] described in example 2 were incorporated and dispersed carefully in this paste with moderate stirring at between 500 and 1000 revolutions/minute for 10 minutes.

The 1000 g of pasty mixture thus obtained were allowed to cool for 15 minutes with gentle stirring at approximately 300 revolutions/minute at ambient temperature.

This beige-coloured paste, which constituted a VCI which could be modelled, was denoted by [8c]. It was effective against the corrosion of ferrous metals.

The volatile anticorrosion efficiency of this VCI modelling paste [8c] was tested on mild steel specimens in the form of blocks. The test used corresponded to the North American standard FED-STD 101, method 4031B, described in example 1.

On completion of this test, it was found that the steel block protected by the corrosion inhibiting vapours, which were evolved from 2 g of the VCI paste [8c] did not exhibit oxidation on its surface.

The same test was performed, as a comparison, using a "control" modelling paste, denoted by [8d] which was identical in every respect to the paste [8c], apart from the fact that it did not contain the VCI identified above [2b]. The 50 g of premix [2b] were replaced in composition [8d] by 50 g of chalk.

On completion of the test, the block protected by the control modelling paste [8d] was completely attacked and many pits and rust were observed over 100% of its surface.

EXAMPLE 9

150 g of castor oil (marketed by Mosselman and containing 90% ricinoleic acid, with a refractive index of 1.48 and an iodine value of 90 g $I_2$/100 g) were loaded, at ambient temperature, into a horizontal mixer of the type with Z-shaped arms, fitted with a double envelope enabling the mixture to be heated and cooled.

650 g of chalk identified in example 7 and 150 g of kaolin identified in example 7 were incorporated and dispersed over 2 hours.

950 g of a smooth natural-coloured non-sticky paste were obtained which constituted the mixture [9a].

The mixture [9a] was brought to a temperature of 65–70° C. and 50 g of the premix [3b], described in example 3, were incorporated therein and carefully dispersed for 10 minutes.

The 1000 g of pasty mixture thus obtained were progressively cooled.

This green-coloured paste, which constituted a VCI which could be modelled, was designated by [9c]. It was effective against the corrosion of copper-based alloys.

Its volatile anticorrosion efficiency was tested by the thioacetamide test, on electrolytic purity copper specimens, according to the Swiss standard SN 289 650. The test performed was identical to that described in example 3, apart from the fact that the film [3c] was replaced by a definite quantity of paste [9c].

On completion of this test, it was found that the copper block protected by 2 g of paste [9c] exhibited, after 48 hours of test, a slight change in colour over approximately 10% of the surface which consisted of a slight golden tint on the periphery of the block, which showed that there was no corrosion.

The same test was performed, as a comparison, using a "control" paste, denoted by [9d], which was identical in every respect to the paste [9c] apart from the fact that it did not contain the VCI identified above [3b]. The 50 g of premix [3b] were replaced in the composition [9d] by 50 g of chalk.

On completion of the test, the block protected by the reference modelling paste [9d] exhibited a very considerable change in colour (intense reddish tint) and tarnishing over 100% of its surface exposed to the confined atmosphere.

EXAMPLE 10

With a view to preparing a VCI, 400 g of part A of a two-component mastic based on a hydroxylated resin (marketed under the trade name LIDEC A 223 D, Part A by CFPI, having a yellow colour and a density of approximately 1.47 g/cm$^3$) were loaded into a horizontal mixer of the type with Z-shaped arms and 10 g of powdered mixture [1a] defined in example 1 were incorporated therein and carefully dispersed for 2 hours.

410 g of a yellow-coloured smooth homogeneous paste were obtained which constituted the mixture [10b].

400 g of this paste [10b] were then thoroughly mixed, with a view to cross-linking, with 40 g of Part B (hardener) of the same two-component mastic (part marketed under the trade name LIDEC A 223 D Part B by CFPI, blue in colour, based on isocyanate and having a viscosity of approximately 2000 mPa.s) so as to obtain 400 g of a viscous green-coloured mixture which, after a few hours at 23° C. and 50% relative humidity became an elastomer with a Shore hardness of 55–60.

This elastomer, which constituted a cross-linkable VCI, was denoted by [10c] and was effective against the corrosion of ferrous metals.

The volatile anticorrosion efficiency of this VCI elastomer [10c] was tested on mild steel specimens in the form of blocks. The test used 2 g of elastomer and corresponded to the North American Standard FED-STD 101, method 4031B, described in example 1.

On completion of this test, it was found that the steel block protected by the corrosion inhibiting vapours which were evolved by the VCI elastomer [10c] did not exhibit oxidation on its surface.

The same test was performed, as a comparison, using a "control" mastic, denoted by [10d], which was identical in every respect to the elastomer [10c], apart from the fact that it did not contain the VCI identified above [1a]. 10 g of the powdered mixture [1a] were replaced in the composition [10d] by 50 g of chalk.

On completion of the test, the block protected by the control mastic [10d] was completely attacked and many pits and rust were observed over 100% of its surface.

What is claimed is:

1. A packaging article, comprising a premix and a component, wherein the component is selected from the group consisting of at least one polymer and at least one filler, wherein:
   said at least one polymer represents at least 50% by weight of the packaging article and is selected from the group consisting of: polyolefins, such as polyethylene, polypropylene, polybutene and copolymers thereof with one or more unsaturated monomers such as vinyl acetate, acrylic acid and esters thereof formed from short chain alcohols; polyvinyl chloride and copolymers thereof, acrylic copolymers and derivatives thereof; polyamides, polystyrenes, polycarbonates, polyesters, polyurethanes, rubbers such as natural rubber, styrene-butadiene and polychloroprene;
   said at least one filler is selected from the group consisting of mineral fillers such as chalks and carbonates, talcs, clays and silicas; and,
   said premix comprises volatile corrosion inhibitors and at least one structuring agent which is a mineral wax or a polyethylene wax selected from the group consisting of a solid or pasty substance and a liquid substance being capable of forming, when mixed with a mineral filler, a pasty or solid substance; said solid or pasty substance being selected from the group consisting of solid, pasty, aliphatic and resinous compounds with a low melting point of between 40° C. and 110° C., the amount of structuring agent being effective to reduce the release of said volatile corrosion inhibitors when said packaging article or premix is formulated as compared to formulating premix in the absence of the structuring agent.

2. The packaging article according to claim 1, wherein the packaging article consists of single films or of assemblies of several elements, said assemblies being produced by employing any suitable method including stapling, crimping, thermoforming, skin-packing or the manufacture of blisters.

3. The packaging article according to claim 1, wherein the premix comprises from about 1% to about 80% by weight of at least one volatile corrosion inhibitor and about 20% to about 99% of at least one structuring agent consisting of a solid or pasty substance having a melting point of from about 40° C. to about 110° C.

4. The packaging article according to claim 1, wherein the solid or pasty structuring agent is selected from the group consisting of linear and/or only slightly branched mono- or polyfunctional aliphatic compounds with hydrocarbon chains having at least 10 carbon atoms.

5. The packaging article according to claim 1, wherein the structuring agent is selected from the group consisting of: linear and/or only slightly branched alipliatic hydrocarbons, such as parades and isoparaffins; polyolefins and copolymers thereof with low molecular masses of 3,000 to 20,000 g/mole.

6. The packaging article according to claim 1, wherein the structuring agent is a resinous compound having a polymeric and/or cyclic structure and which may contain, in a minor proportion, aromatic derivative and cyclic terpenes.

7. The packaging article according to claim 1, wherein the premix comprises at least one volatile corrosion inhibitor selected from the group consisting of: nitrogen-containing derivatives such as, aliphatic, aromatic, acyclic or cyclic anlines, such as dicyclohexylamine, cyclohexylamine, morpholine, diisopropylamine and benzylamine, organic salts thereof, such as benzoates, carbamates, laurates, caprylates, and succinates, or inorganic salts thereof such as nitrites, nitrates, carbonates, phosphates, and phosphites; and, heterocyclic compounds such as imidazole and derivatives thereof, triazes and derivatives thereof, as well as hexamethylenetetramine; reaction products of oxido nitrogen-containing derivatives such as alkali metal or alkaline earth salts of nitrous acid which have a vapour pressure of at least $10^{-5}$ mm Hg at 20° C.

8. The packaging article of claim 1, wherein the solid or pasty aliphatic and/or resinous compound has a melting point of between 50° C. and 90° C.

9. The packaging article according to claim 1 having a form selected from the group consisting of films which are retractable, flexible or rigid, wires, tubes, sheets, or pasty solids with a plastic character.

10. The sheets according to claim 9, wherein the sheets define a space between the sheets and the space is in a form of cells.

11. The packaging article of claim 1, wherein the premix comprises from 20% to 60% by weight of at least one volatile corrosion inhibitor.

12. The packaging article of claim 1, wherein the premix comprises from 40% to 80% of at least one structuring agent.

13. A process for producing the packaging article of claim 1 made of polymeric material comprising the steps of:
   preparing the premix; and,
   subsequently incorporating said premix in the polymer.

14. A process for producing the packaging article of claim 1 in the form of a pasty solid with a plastic character comprising preparing a formulation by mixing in one step the constituents of the premix with the filler.

15. A process for protecting metal parts against corrosion comprising the steps of:
   forming a cavity in the packaging article of claim 1; and,
   placing the metal parts in said cavity.

16. A process for protecting metal parts against corrosion comprising the step of bringing the pasty solid packaging article of claim 1 having a plastic character into a form adapted to dimensions of the metal parts to be protected against corrosion.

* * * * *